US009809738B2

(12) United States Patent
Luke et al.

(10) Patent No.: US 9,809,738 B2
(45) Date of Patent: Nov. 7, 2017

(54) MICROBIAL-ENHANCED WELL CEMENTING AND REMEDIATION

(71) Applicant: TRICAN WELL SERVICE LTD., Calgary (CA)

(72) Inventors: Karen Luke, Calgary (CA); Duane Brownlee, Calgary (CA)

(73) Assignee: Trican Well Service Ltd., Calgary (CA)

( * ) Notice: Subject to any disclaimer, the term of this patent is extended or adjusted under 35 U.S.C. 154(b) by 186 days.

(21) Appl. No.: 14/536,430

(22) Filed: Nov. 7, 2014

(65) Prior Publication Data
US 2015/0122486 A1 May 7, 2015

(30) Foreign Application Priority Data
Nov. 7, 2013 (CA) .................................... 2832791

(51) Int. Cl.
E21B 33/13 (2006.01)
C09K 8/467 (2006.01)
C09K 8/42 (2006.01)
C04B 28/02 (2006.01)

(52) U.S. Cl.
CPC .............. C09K 8/467 (2013.01); C04B 28/02 (2013.01); C09K 8/428 (2013.01); E21B 33/13 (2013.01)

(58) Field of Classification Search
None
See application file for complete search history.

(56) References Cited

U.S. PATENT DOCUMENTS

| | | | |
|---|---|---|---|
| 5,143,155 A * | 9/1992 | Ferris | C09K 8/905 166/246 |
| 7,530,396 B1 | 5/2009 | Reddy et al. | |
| 7,607,482 B2 | 10/2009 | Roddy et al. | |
| 7,607,484 B2 | 10/2009 | Roddy et al. | |
| 7,617,870 B1 | 11/2009 | Roddy et al. | |
| 7,647,970 B2 | 1/2010 | Mueller et al. | |
| 8,030,253 B2 | 10/2011 | Roddy et al. | |
| 8,236,100 B2 | 8/2012 | Le Roy-delage et al. | |
| 8,460,458 B2 | 6/2013 | Jonkers | |
| 2006/0216811 A1* | 9/2006 | Cunningham | B65G 5/00 435/262 |
| 2007/0137528 A1 | 6/2007 | Le Roy-delage et al. | |
| 2007/0289744 A1* | 12/2007 | Bingamon | C04B 28/04 166/293 |
| 2009/0139710 A1 | 6/2009 | Robisson et al. | |
| 2010/0081733 A1 | 4/2010 | Michaux et al. | |
| 2011/0011303 A1* | 1/2011 | Jonkers | C04B 20/1022 106/15.05 |
| 2011/0073307 A1* | 3/2011 | Miller | E21B 27/00 166/268 |
| 2011/0100263 A1 | 5/2011 | Chattopadhyay et al. | |
| 2011/0262640 A1 | 10/2011 | Dosier | |
| 2014/0315765 A1* | 10/2014 | McDaniel | C09K 8/582 507/201 |
| 2015/0204176 A1* | 7/2015 | Cunningham | E21B 43/26 166/281 |

FOREIGN PATENT DOCUMENTS

| | | |
|---|---|---|
| EP | 2025732 A1 | 2/2009 |
| EP | 2199539 A1 | 6/2010 |
| EP | 2404884 A1 | 1/2012 |
| EP | 2450417 A1 | 5/2012 |
| EP | 2487141 A1 | 8/2012 |
| EP | 2518034 A1 | 10/2012 |
| WO | WO 2004/101925 A1 | 11/2004 |
| WO | WO 2004/101951 A1 | 11/2004 |
| WO | WO 2006/066326 A1 | 6/2006 |
| WO | WO 2008/034461 A1 | 3/2008 |
| WO | WO 2011/126361 A1 | 10/2011 |

OTHER PUBLICATIONS

Park et al. (2012) J. Microbiol. Biotechnol. 22(3): 385-389.
Jonkers, et al., Application of Bacteria as Self-Healing Agent for the Development of Sustainable Concrete, Ecological Engineering 36 (2010), pp. 230-235.
Jonkers, et al. Self-Healing of Concrete by Bacterial Mineral Precipitation, Tu Delft (2015).
Zolfagharifard, Elie, Wise Crack: Self-Healing Concrete, The Engineer, First for Technology & Innovation (2011), www.theengineer.co.uk.
Arnold, D., Self-Healing Concrete, Ingenia Issue 46 (Mar. 2011), pp. 39-43.

(Continued)

Primary Examiner — Angela M DiTrani
Assistant Examiner — Andrew H Sue-Ako
(74) Attorney, Agent, or Firm — Parlee McLaws LLP (CGY); Sean Goodwin; Susan Rancourt

(57) ABSTRACT

Described are a method and composition which use microorganisms for downhole applications, in particular for the maintenance or restoration of the integrity of a cement sheath in a wellbore. The method of cementing a wellbore comprises preparing a cement composition comprising a pumpable slurry of cement, water and a healing agent that comprises one or more microorganisms, delivering the cement composition into the wellbore and allowing the cement composition to set. The method of restoring the integrity of a set cement composition in a wellbore comprises preparing a pumpable slurry that comprises water, a healing agent that comprises one or more microorganisms and optionally cement, pumping the slurry into the wellbore in and around the set cement composition, and allowing the one or more microorganisms to grow and replicate to thereby restore the integrity of the set cement composition. Compositions for carrying out the methods are also described.

19 Claims, No Drawings

(56) References Cited

OTHER PUBLICATIONS

SPE/IADC 105781—Cavanagh et al., Self-Healing Cement—Novel Technology to Achieve Leak-Free Wells.
SPE 110523—Moroni et al., Overcoming the Weak Link in Cemented Hydraulic Isolation.
IADC/SPE 128226—Le Roy-Delage et al., Self-Healing Cement System—A Step Forward in reducing Long-Term Environmental Impact.
Van Tittelboom et al. (2010) Cement and Concrete Research 40: 157-166.
Bang et al. (2005) Proceedings of the 27th International Conference in Cement Microscopy.
International Search Report and Written Opinion, PCT/CA2014/051078—Microbial-Enhanced Well Cementing and Remediation.

* cited by examiner

MICROBIAL-ENHANCED WELL CEMENTING AND REMEDIATION

CROSS REFERENCE TO RELATED APPLICATION

This application claims the benefit of Canadian Patent Application No. 2,832,791, filed on Nov. 7, 2013, the entire disclosure of which is incorporated herein by reference in its entirety.

FIELD

The present disclosure relates to the use of microorganisms to self-heal cracking or voids in conventional cement formulations in wells or to remediate wells in which there has been a loss of integrity of the cement sheath.

BACKGROUND

During the construction of underground wells, it is common, during and after drilling, to place a liner or casing, secured by cement pumped into the annulus between the wellbore and the outside of the liner. The cement serves to support the liner and to provide isolation of the various fluid-producing zones through which the well passes. In order to fulfill this function, it is necessary that the cement be present as an impermeable continuous sheath. However, for various reasons, over time the sheath placed in the annular space between the casing and the formation can lose its integrity (for example, deteriorate and become permeable) and hence its ability to maintain zonal isolation.

This loss of integrity is associated with formation of cracks or micro annulus in the cement matrix and can result from stresses imposed on the set cement due to cyclic pressure or thermal expansion and contraction of the casing, repeated impacts from the drill bit, chemical erosion from aggressive formation fluids/gases and external forces on the cement. The deterioration can be due to physical stresses caused by tectonic movements, temperature effects, chemical degradation of the cement, or various other reasons.

When cracks or other failures of the cement sheath do occur, it is common to attempt to pump and place one or more settable fluids or slurries into the failed part of the sheath in an attempt to regain isolation or well integrity. This procedure is generically referred to a remedial cementing.

There have been a number of proposals to deal with the problems of deterioration of the cement sheath over time. For example, an early approach was to make the set cement more flexible by addition of fibres or by making foamed cement. Although these methods can help to minimize formation of cracks or micro-annuli they do not eliminate formation of cracks or micro-annuli.

Another approach has been to develop and use self-adaptive cement/self-healing cement to solve the problem of crack or micro annulus formation and loss in zonal isolation. These cements contain a product that will swell on exposure to one or more types of downhole fluids and effectively block/seal cracks or micro annulus.

The following publications illustrate the use of self-adaptive/self-healing cement formulations containing a chemical that swells when exposed to liquid or gaseous hydrocarbons: US 2007/0137528 A1, US 2009/0139710 A1, U.S. Pat. Nos. 7,607,482, 7,607,484, 7,617,870, 7,647,970, 8,030,253, SPE/IADC 105781—Cavanagh et al., Self-Healing Cement—Novel Technology to Achieve Leak-Free Wells, SPE 110523—Moroni et al., Overcoming the Weak Link in Cemented Hydraulic Isolation, IADC/SPE 128226—Le Roy-Delage et al., Self-Healing Cement System—A Step Forward in reducing Long-Term Environmental Impact. Self-adaptive cement system that can compensate for changes or faults in the physical structure of cement after setting WO/2004/101951.

The following publications illustrate the use of self-adaptive/self-healing cement formulations containing a chemical that swells when exposed to methane: European Patent Application EP 2 450 417, European Patent Application EP 2 487 141, European Patent Application EP 2 518 034.

PCT Publication No. WO 2004/101925 illustrates the use of self-adaptive/self-healing formulations containing a chemical that swells when exposed to water in oil and gas wells.

European Patent Application EP 2 199 539 A1 illustrates the use of self-adaptive/self-healing cement formulations containing a combination of two chemicals: one that swells when exposed to liquid and/or gaseous hydrocarbons; and a second that swells on exposure to water oil and gas wells.

European Patent Application EP 2 404 884 A1 illustrates the use of self-adaptive/self-healing formulations containing a chemical that swells when exposed to carbon dioxide.

The following references illustrate the use of self-adaptive/self-healing cement formulations containing a chemical that swells when exposed to liquid and/or gaseous hydrocarbons and/or water and/or carbon dioxide: European Patent Application EP 2 025 732 A1, European Patent Application EP 2 025 732 A1.

U.S. Pat. No. 7,530,396 illustrates the use a self-adaptive/self-healing cement formulation containing an elastomeric material that exhibits a phase transition and/or cold flow behavior at bottom hole static temperature.

The following publications illustrate the use of cement formulations containing a significant amount of cement that is left intentionally un-hydrated when the cement sets and hydrates only when or if the cement sheath is damaged: WO 2008/034461 A1 and US Patent Application 2010/0081733 A1.

U.S. Pat. No. 8,236,100 discloses methods of characterizing the self-healing properties of a set cement in contact with hydrocarbons in an oil and/or gas well.

Methodologies for enhancing the compressive strength of cement-based materials, or for remediating/repairing these materials, based on the application of microbes, have been developed in recent years. One such methodology uses mineral-producing bacteria, which are capable of precipitating calcium carbonate ($CaCO_3$). Mineral-producing bacteria have been used for the consolidation of sand columns, healing of cracks in granite, for surface treatment of limestone, including for healing creaks in cement-based materials. See for example, Jonkers, H. M et al. (2010) Ecological Engineering 36: 230-235; Van Tittelboom et al. (2010) Cement and Concrete Research 40: 157-166; Arnold, D. (2011) Ingenia 46:39-42; Bang et al. (2005) Proceedings of the 27$^{th}$ International Conference in Cement Microscopy; US Patent Publication No. 2011/0262640; U.S. Pat. No. 8,460,458.

Two different mechanisms for microbiological deposition of $CaCO_3$ are known. The first is a urease based mechanism (see e.g., Van Tittelboom et al. (2010) Cement and Concrete Research 40: 157-166; Bang et al. (2005) Proceedings of the 27$^{th}$ International Conference in Cement Microscopy; US2011/0262640). The bacterial urease catalyzes the hydrolysis of urea into ammonium and carbonate. The carbonate ions produced react with cations from the environment, such as $Ca^{2+}$, (e.g., from $CaCl_2.2H_2O$) which leads to the precipitation of $CaCO_3$ at the cell surface. Several ureolytic bacteria of the genus *Bacillus*, which is a spore forming bacterium, are known to precipitate $CaCO_3$.

An alternative metabolic mineral-producing pathway has also been used for deposition of $CaCO_3$ (see e.g., Jonkers, H. M et al. (2010) Ecological Engineering 36: 230-235; U.S. Pat. No. 8,460,458). In this pathway the bacterial conversion of calcium lactate to yield $CaCO_3$ and $CO_2$ is exploited. The produced carbon dioxide further reacts with portlandite ($Ca(OH)_2$) to form additional $CaCO_3$ and water.

Another bacterial-based methodology for improving the compressive strength of a cement-based material uses bacteria to deposit films of organic materials (biofilms) which are capable of increasing the compressive strength of a cement-sand mortar (see e.g., Park et al. (2012) J. Microbiol. Biotechnol. 22(3): 385-389).

SUMMARY

The present disclosure provides for the use of microorganisms for downhole applications, in particular relating to the maintenance or restoration of the integrity of a cement sheath in a wellbore.

In one aspect, disclosed herein is composition for well cementing comprising a pumpable slurry of cement, water and a healing agent, wherein the healing agent comprises one or more microorganisms.

In another aspect, disclosed herein is a composition for well cementing comprising a dry cement formulation and a healing agent, wherein said healing agent comprises one or more microorganisms.

In yet another aspect, disclosed herein is a method of cementing a wellbore comprising:
a) preparing a cement composition comprising a pumpable slurry of cement, water and a healing agent that comprises one or more microorganisms;
b) delivering the cement composition into the wellbore; and
c) allowing the cement composition to set.

In some embodiments the preparing of the cement composition comprises introducing the one or more microorganisms to one or more of the cement, water or cement slurry.

In some embodiments the preparing of the cement composition further comprises introducing a nutrient for the one or more microorganisms to one or more of the cement, water or cement slurry.

In some embodiments, the method further comprises, when the integrity of the set cement composition is breached, activating the one or more microorganisms in the set cement thereby causing them to grow and replicate.

In another aspect disclosed herein is a method of restoring the integrity of a set cement composition in a wellbore, said method comprising:
a) preparing a pumpable slurry that comprises water, a healing agent that comprises one or more microorganisms and optionally, cement;
b) pumping the slurry into the wellbore in and around the set cement composition; and
c) allowing the one or more microorganisms to grow and replicate to thereby restore the integrity of the set cement composition.

In some embodiments of the composition or method the microorganism is a spore. In some embodiments the microorganism is encapsulated. In other embodiments of the composition or method the microorganism is encapsulated for release after the cement is set. In yet other embodiments, the microorganism is capable of depositing calcium carbonate ($CaCO_3$) or lime ($Ca(OH)_2$). In yet other embodiments the microorganism is capable of depositing a biopolymer.

The nutrient may be a carboxylic acid calcium salt. In some embodiments of the composition or method, the nutrient is calcium lactate. In some embodiments the nutrient is encapsulated.

In another aspect disclosed herein is a method of restoring the integrity of a set cement composition in a wellbore, said method comprising:
a) delivering a healing agent to the set cement in the wellbore, the healing agent comprising one or more microorganisms;
b) allowing the one or more microorganisms to grow and replicate within the set cement to thereby restore the integrity of the set cement composition.

In one embodiment of this method, the delivering step comprises:
a) introducing the one or more microorganisms to a conveyance fluid; and
b) delivering the conveyance fluid to the set cement composition.

In another embodiment of this method, the introducing step further comprises introducing a nutrient to the conveyance fluid.

In yet another embodiment the delivering step comprises:
a) isolating a portion of the wellbore having set cement requiring repair; and
b) delivering the healing agent to the isolated portion of the wellbore.

In yet another embodiment the delivering step comprises:
a) forming a fluid communication path in the wellbore along a portion of the set cement requiring repair; and
b) introducing the healing agent to the fluid communication path.

DETAILED DESCRIPTION

As previously described, the integrity of a cement sheath can be breached by the formation of cracks, fissures or micro-annuli in cement formations, or by the separation of the cement sheath or part of it from the casing which it envelops or from the geologic formations which it is intended to isolate, thereby creating pathways or spaces along which water, gas, oil or other substances can travel.

The methods and compositions described herein maintain or restore the integrity of a cement sheath by healing the cracks, fissures or micro-annuli should they occur, or by sealing the spaces that are formed by the separation of the cement sheath from the casing. This is accomplished by using microorganisms, in combination with well-known primary and remedial cementing methodologies. The microorganisms may therefore be used in primary cementing applications as a healing agent to self-heal conventional cement formulations ("self-healing") or they may be used in remedial cementing applications to remediate a cement sheath that has become damaged and/or failed ("bio-healing"). The microorganisms or spores used in the methods and compositions described herein are selected or adapted to grow and replicate in the harsh downhole environment in a wellbore.

Primary cementing is the process of mixing a slurry of cement, cement additives and water and pumping it down through casing to specific points in the annulus between the casing and the formation (or another tubing string) or in the open hole below the casing string. The two principal purposes of primary cementing are to restrict fluid movement between the formations (zonal isolation) and to bond and support the casing. The methods of conducting primary cementing operations are well known to persons of skill in the art.

Remedial cementing is usually done to correct problems associated with the primary cementing job. Remedial cementing operations consist of two broad categories, squeeze cementing and plug cementing. The methods of conducting remedial cementing operations are well known to persons of skill in the art.

Broadly, in the context of self-healing, the method includes adding microorganisms (or their spores), with or without nutrients, either to the dry cement formulation or to the mix water of a cement slurry, or to the slurry used for primary cementing, and pumping the slurry downhole using conventional means. The microorganisms or spores may be added as is, or encapsulated in porous materials with or without nutrients, or immobilized on a substrate. These organisms may grow while the cement formulation is setting, and can persist in the cement for a long period of time afterwards. Under favourable growth conditions downhole they will be activated to grow, and may remediate cracks and fissures and other damage in the cement.

Broadly, in the context of bio-healing, that is, for remediating cement sheaths which have developed cracks or otherwise have lost their integrity after they have been set, the method includes preparing a slurry that comprises microorganisms (or their spores), with or without nutrients, with or without a cement or other settable agent, and pumping the slurry downhole using conventional means. The microorganisms or spores may be added as is, or encapsulated in porous materials with or without nutrients, or immobilized on a substrate. These organisms may grow to restore integrity of the cement sheath and otherwise block flowpaths in and around the cement sheath by depositing biominerals or biopolymers. Alternatively or in addition, their stimulated growth (either through increased cell size or cell count) may increase the total biomass of the microorganisms in the crack or micro-annulus, resulting in the restoration of the integrity of the cement sheath through the sealing of the crack or microannulus with the microorganisms themselves.

A potential advantage of using microorganisms is that the microorganisms may grow when a crack is exposed to annular fluid/gas nutrient and when the crack is sealed the microorganism may remain dormant. According to the method described herein the microorganism grows when a crack or micro-annulus forms and nutrients are available and remains in spore form to grow again when and if additional cracks or micro-annuli form, to self-heal the cement sheath throughout the life of the well.

Microorganisms in addition have the advantage that they can be genetically modified to produce bio-materials the production of which can be switched on and off by change in temperature, pressure or chemical environment, can enhance the performance of the cement sheath around the crack and micro-annuli by increasing compressive strength on forming biominerals, forming fibrous material to give reinforcement and flexural strength and to improve sealant properties on forming glue-like materials. Examples of such bio-materials may include biopolymers, polypeptides, bio-surfactants and chitin.

Naturally occurring microorganisms may be used to self-heal or bio-heal the cement sheath, rather than using specific chemicals that swell on exposure to one or more downhole fluids (as is used in the known methods). One additional potential advantage of the methods described herein is that microorganisms are not necessarily limited to the concentration added to the cement which is the case of the chemicals used in the conventional methods. Once an added chemical is used up it is no longer available to seal any additional crack or micro annulus that may form in the cement sheath. Microorganisms can rapidly multiply given the ideal conditions and remain dormant in between times when conditions are not ideal. If the microorganisms are cultivated to survive on one or more downhole fluids or chemicals derived from them then it is envisaged that these microorganisms will continue to reproduce indefinitely when cracks or micro-annuli develop and conditions favour new growth.

Cementing

Nearly all well cementing operations used Portland cement, which consists mainly of anhydrous calcium silicate and calcium aluminate compounds that hydrate when added to water. However, the use of cements other than Portland cement is included in the methods and compositions described herein, for example calcium aluminate cement, calcium phosphate cement, magnesium phosphate cement, pozzolanic cement or mixtures containing any of these.

Well cements must perform over a wide variety of temperature ranges—from below freezing in permafrost zones to temperatures of up to 500° C. in geothermal wells. Consequently, different versions of Portland cement may be used in wells. In addition, cement additives are used to adjust cement performance thereby providing customized cement formulations for a particular well environment. Additives include accelerators, retarders, extenders, weighting agents, fluid loss control agents, lost circulation control agents, dispersants, and specialty agents such as antifoam agents, fibers and flexible particles. The use of different versions of Portland cement, and cement additives, is included in the methods and compositions described herein.

The matrix of fresh cement is highly alkaline due to the formation of sodium and potassium hydroxide from alkali sulphates and from the formation of portlandite (calcium hydroxide), generally having a pH between about 11 to about 13. Microorganisms useful in the methods and compositions herein therefore are able to withstand a high alkalinity for prolonged periods of time.

The ability of the microbes to enter the cracks, micropores or pores in the cement may be an important consideration, as it is in these spaces where the bacteria or their products must be deposited in order to seal them. Bacteria can vary widely in size, depending on the species and growth conditions.

Wellbore Conditions

It is generally necessary to select a suitable microbe or combination of microbes that can grow and survive under the wellbore conditions in which they will be used. The following parameters are relevant in determining the suitability of a particular microorganism for use in the methods and compositions described herein:

a) Alkaline tolerance: The matrix of fresh cement is highly alkaline particularly due to the formation of portlandite (calcium hydroxide), generally having a pH between about 11 to about 13. Microorganisms useful in the methods and compositions herein therefore should be able to withstand a high alkalinity for prolonged periods of time.

b) Pressure tolerance: Pressure is a function of depth, and microbes should be able to survive at the pressures to which they will be exposed. Annular pressures in shallow on-shore wells are likely to be in the range of 50-1000 atm, whereas pressures in offshore or deep onshore wells may be up to about 2000 atm;

c) Temperature tolerance: Temperature in wells is a function of depth, and microbes should be able to survive at the temperatures to which they will be exposed. Low temperature wells have a temperature in the range of about 20° C. to about 80° C. High temperature wells have a temperature of between about 80° C. and about 300° C.;

d) Anaerobic tolerance: The downhole environment is generally anaerobic, thus microbes should be able to survive and grow in an anaerobic environment;

e) Salt tolerance: Reservoir brines can often be near saturated solutions, thus the microbes should be able to withstand the effects of salts; and f) Resistant to Oil or Gas toxicity: Microbes should be tolerant of oil and gas to which they may be exposed, in the well.

Nutrients

In order for the microorganisms to grow and survive downhole, a quantity of nutrients may need to be provided in situ. The nutrients may be supplied together with, before, or after the injection of the microbes.

In some embodiments the microorganisms are capable of biomineralization, that is, they form (either directly through excretion or indirectly through another chemical which in turn results in the formation) heterogeneous organic or inorganic compounds such as calcites, carbonates, phosphates, silicates, oxides, oxalates and sulphur or iron-containing minerals. Thus, the nutrients disposed downhole may be a chemical biomineral precursor compound such as calcium formate, calcium acetate, calcium lactate, or other carboxylic acid calcium salt. Preferred for use herein is calcium lactate, which is known to increase compressive strength of cement-based materials, and accelerate hydration.

In one embodiment of the compositions and method described herein, microorganisms are utilized that use hydrocarbon, methane, carbon dioxide or source of mineral nutrients obtained downhole that will stimulate growth (either through increased cell size or cell count) or deposition of biopolymers, and thereby increase the total biomass of the microorganisms in the crack or micro-annulus, resulting in the restoration of the integrity of the cement sheath through the sealing of the crack or microannulus with the microorganisms themselves or with the biopolymers they secrete. In one embodiment the microorganism may use calcium nitrate as a nutrient for the nitrate-driven anaerobic oxidation of methane, which produces carbon dioxide that may be used in the generation of lime or $CaCO_3$.

Other nutrients that may be used herein include urea (for ureolytic bacteria), or food sources such as, yeast extract, peptone, molasses, grain wort and grain malt.

The nutrients may be introduced downhole in an encapsulated form (see for e.g., U.S. Pat. No. 8,460,458 to Jonkers, incorporated herein by reference in its entirety). Encapsulation materials useable in the methods and compositions described herein include, but are not limited to, porous expanded clay particles or fly-ash particles. Impregnated clay particles contain from about 4-6% calcium lactate by weight in grams of the expanded clay particles. The specific density of the particles may be between 0.4 and 2 g $cm^{-3}$. When used in encapsulating nutrients, the surface pore may have a width of 0.01 to 1 μm.

Microorganisms

A wide variety of microorganisms may be used. The choice of species will ultimately be the choice of those of skill in the art and will vary depending on the conditions encountered in a particular well which is to be cemented and/or remediated. Wellbore conditions which will influence the choice of species have been discussed above. Microbes that can survive under a particular wellbore condition may be isolated from the environment—e.g., thermophilic alkaline tolerant bacterium for high temperature wells. Alternatively the microbes may be engineered to have the required tolerances by progressive adaptation of the microbe to the desired conditions—e.g., adaptation of a thermophilic bacterium to high pressure, for high temperature/pressure wells, or adaptation of a formation-indigenous microorganism to alkalinity. Methods for adaptation of bacteria to new growth conditions are well-known in the art. Generally this involves growing the bacterial strain under increasing levels of a condition to which the strain is being adapted, e.g., salt or pH.

Preferably the microorganisms are spore-forming microorganisms that can form spores which will survive for months, years or decades downhole.

The diameter of bacterial spores may be in the range of about 0.5-2.0 μm and the pore diameter of hydrated cement is between 0.01 and 1.0 μm (small pores μm (0.01-0.1 μm), large pores (0.1-1.0 μm)). Thus, the viability of spores can be adversely affected by the pore diameter of hydrated cement.

To overcome this problem, in some embodiments the microorganisms may be introduced downhole in an encapsulated form. Thus, the spores or bacteria can be encapsulated in a porous material. Encapsulation materials useable in the methods and compositions described herein include, but are not limited to, porous expanded clay particles or fly-ash particles (see for e.g. U.S. Pat. No. 8,460,458 to Jonkers, incorporated by reference herein in its entirety). The surface pore has a width of 1.0 to 100 μm, and preferably between 1.0 and 15 μm. Impregnated clay particles can contain from $1.0 \times 10^5$ to $10^9$ $cm^{-3}$ bacterial spores per gram of expanded clay particles. Also of benefit is to have food source (e.g., calcium lactate) available in the clay particle so when crack occurs in the cement and there is an increase in porosity of the hydrated cement, the spores will vegetate and multiply.

Microorganisms useful in the methods and compositions described herein can preferably grow and survive in an extreme alkaline environment, as many cements have a highly alkaline pH. Accordingly, compositions and methods using alkali-resistant spore forming microorganisms are preferred. Alternatively, pH neutral resistant spore forming microorganisms are suitable for use in encapsulated systems.

Microorganisms useful in the methods and compositions described herein can grow and survive under anaerobic conditions.

In some embodiments the microorganisms useful in the methods and compositions described herein can grow and survive at high pressures, for example 1 atm-1000 atm (0.1-100 MPa).

In some embodiments the microorganisms useful in the methods and compositions described herein can survive at the high downhole temperatures to which they will be exposed, for example 20 to 125° C.

Biomineralization is a process by which microorganisms form (either directly through excretion or indirectly through another chemical which in turn results in the formation) heterogeneous organic or inorganic compounds such as calcites, carbonates, phosphates, silicates, oxides, oxalates and sulphur or iron-containing minerals. Without being bound by any particular theory, in the case of self-healing, the inventors believe that the minerals formed on and around the microorganisms in the set cement or injected in and around the set cement fill the cracks and micro-annuli which develop. Accordingly, in some embodiments, the microorganisms used in the method and compositions described herein are capable of depositing biominerals while growing in and around the cement in the wellbore. Preferred are bacteria that are capable of depositing calcium carbonate ($CaCO_3$) while growing in and around the cement in the wellbore.

The following microorganisms are examples of microorganisms that may be used, in accordance with the present disclosure:

Calcium Carbonate Forming
*Bacillus subtilis*
*BacillaFillia* (genetically modified *Bacillus subtilis*)
*Bacillus pasteurii*
*Bacillus sporosarcina pasteurii*
*Bacillus sphaericus*
*Bacillus shewanella*
*Bacillus psuedofirmus*
*Bacillus cohnii*
*Bacillus psychrophilius*
*Bacillus globisporus*
*Bacillus alkalinitrilicus*
*Bacillus aeruginosa*
*Bacillus* strain B2-E2-1
*Bascillus sp.* CT-5
*Planococcus okeanokoites*
*Filibacter limicola*
*Pseudomonas aeruginosa*
*Sporosarcina uraea*
*Proteus vulgaris*
*Myxococcus Xanthus*
*Proteus mirabilis*
*Helicobacter pylori*
Formation Indigenous Micro-Organisms
*Actinomycetes*
*Methanobacteriacaea*
*Comamonadacaeae*
*Firmicutes*
*Desulfotomaculum nigrificans*
*Desulfovibrio*
*Desulfomicrobium*
*Eubacterium*
*Psuedomonas*
*Serratia*
*Shewalla*
*Methanomicrobium*

Thermophilic (Archaea)
*Pyrococcus furiosus*
*Pyrococcus woesei*
*Methanococcus jannaschii*
*Methanopyrus kandler*
*Pyrodictium abyssi*
*Thiomicrospira crunogena*
*Pyrococcus*-Strain GB-D
*Pyrococcus*-Strain GB-4
*Pyrococcus*-Strain GB-6
*Pyrococcus*-Strain MAR-7C
*Methanococcus*-Strain CS-1
*Methanococcus*-Strain FC
*Desulfurococcus*-Strain SY (Bacteria)
*Thermotoga*
*Acholeplasma laidlawii*
*Thermophile* ES4
*Pseudomonas*-Strain I-2
*Bacillus*-Strain 47
*Bacillus*-Strain BCI-1

Alkali Environment

*Virgibacillus*
*Halobacterium salinarum*
*Natronomonas pharaonis*
*Bacillus sp.* TA2.A1
*Alkaliphilus transvaalensis*
*Alkaliphilus metalliredigens*
*Oceanobacillus oncorhynchi*
*Salinivibrio costicola*

Alkali and Thermal Environments

*Thermococcus alcalphius*
*Clostridium paradoxum*
*Clostridium thermoalakaliphilum*
*Thermopallium natronophilum*
*Anaerobranca gottschalkii*
*Bascillus alcaliphilus*
*Natromonas pharaonis*

*Bacillus cohnii*, *Bacillus pseudofirmus*, *Bacillus alkalinitrillus*, *Bacillus pasteurii*, *Bacillus lentus*, *Bacillus sphaericus* and *Sporosarcina pasteurii* are alkali-resistant spore forming bacteria. The spores remain viable but dormant in cement, are resistant to mechanical and chemical stresses, and the organisms generate $CO_2$ and form limestone. These organisms are preferred for use in the methods and compositions described herein.

*Bacillus cohnii*, *Bacillus pseudofirmus* and *Bacillus alkalinitrillus* generate calcium carbonate. Preferred for use in the methods and compositions described herein is *Bacillus pseudofirmus*.

Primary Cementing Methods

Microbes may be used to avoid loss of well integrity in primary, i.e. newly constructed wells, cementing applications, or as a self-healing mechanism to repair a breach of well integrity that occurs, with or without intervention from the surface. This may be done by preparing a slurry containing the microbes, cement, and optionally nutrients, and injecting the slurry downhole using cementing processes known to those of skill in the art. The organisms in the cement may replicate and may deposit minerals or biopolymers as the cement is setting. Should a loss of integrity of the cement sheath develop in the cement after it is set, the microorganisms may be activated to replicate and deposit minerals (e.g., $CaCO_3$) or to deposit a bacterial mass or one or more types of biopolymers such as a glucopolysaccharide, to fill in the gaps and self-heal the cement. This activation may be occasioned by the downhole environment itself without intervention from the surface, or it may be occasioned by injection of the appropriate nutrients or other compounds downhole to cause activation.

In some embodiments the microbes are utilized in surface casings. Such surface casings are adapted to self-heal and thus prevent and/or reduce surface migration and venting to the atmosphere of gas and fluids (including oil and water). Such surface casings can be used in new wells, or utilized in remedial cementing work of old wells.

To obtain the benefit of self-healing in primary cementing methods, the microorganisms may be used individually or as a combination consisting of two or more species. Different species may be required over the length of a deep vertical wellbore.

Before pumping a cement slurry into a wellbore, it is common for the wellbore to be filled with a fluid of some sort (e.g., drilling fluid). To ensure that this fluid and the pumped cement slurry have minimal if any contact or intermixing, it is the norm to pump a volume of a spacer fluid of some kind prior to pumping in the cement slurry. This spacer fluid is designed to be compatible with both the wellbore fluid in front and the cement slurry behind.

Means of introducing the microbes and/or nutrients into the slurry include putting them into: the mix water, the dry cement, the other components that go into the slurry (such as a gas), the completed slurry itself, the drilling fluid, the fluid pumped in front of the cement (e.g., spacers). The concentration of microbes is preferably in the range of about $10^4$ to $10^9$/mL of slurry, preferably about $10^7$/mL of slurry.

Remediation Methods

Microbes may be used to restore the integrity of a cement sheath in a remedial cementing application (bio-healing). This may be done by circulating a slurry containing the microbes, with or without nutrients and with or without cement or other settable agent, into the existing well in and around the cement, at or near the location of failure. The organisms thus placed can access the cracks, fissures or other spaces, to deposit minerals such as $CaCO_3$ or lime, to deposit a bacterial mass or a biopolymer such as a glucopolysaccharide, to fill in the gaps and thereby restore the integrity of the cement.

Where cement has been set in the well and is compromised, a fluid must be injected into or alongside the set cement in an attempt to regain integrity. Where the permeability into this space allows, it is not uncommon to use another cement slurry for this process. A bio-healing cement comprising a microbial agent can be applied using known methodologies for repairing a cement sheath to regain isolation. If the permeability into the space is sufficiently low that a cement slurry is unsuitable due to its viscosity, or because it is composed of particles that are too large to enter the space, a fluid or slurry of water and microbes, optionally comprising other compounds and fluids, may be injected into the space. The microbial agents may then fill the space by depositing minerals such as $CaCO_3$ or lime, a bacterial mass and/or a biopolymer such as a glucopolysaccharide, to fill in the gaps and thereby regain isolation.

To obtain the benefit of bio-healing the microorganisms may be used individually or as a combination consisting of two or more species. Different species may be required over the length of a deep vertical wellbore.

Placing a slurry into the annulus is accomplished in a fashion not unlike that used in the primary cementing. Occasionally this occurs between perforations that have been put into the casing and surface where such circulation can be established. Commonly, however, circulation to surface cannot be achieved and instead a second set of perforations is required through which circulation can be attempted with the use of a packer or similar device set between the axially spaced perforations. In the cases where no such circulation can be established either between perforations or to surface, a 'block' squeeze is commonly performed by simply squeezing slurry into one or more sets of perforations in the well. In all the above cases the intent is to replace the fluid(s) that are not hardened cement with a settable fluid that will then harden and thus restore isolation.

Means of introducing the microbes and/or their nutrients into the slurry to be pumped into the well include putting them into: the mix water, the dry cement (if used), the other components that go into the slurry (such as solid additives or a gas), or into the completed slurry itself. The concentration of microbes is preferably in the range of about $10^4$ to $10^9$/mL of slurry, preferably about $10^7$/mL of slurry.

Microbes and/or their nutrients may also be added to either a fluid or a gas or a gas/fluid mix that would then be circulated into the void volume. This would have the advantage of being more easily placed into 'tight' or low permeability areas. This method may be particularly suitable to embodiments that use migrating wellbore gas or fluids as nutrients to seal up a crack/leak in an existing well.

EXAMPLES

Growth of *Bacillus pseudofirmus* in Anaerobic Conditions

*Bacillus pseudofirmus* was incubated under anaerobic conditions for 28 days, in alkaline medium containing calcium lactate as a food source and nitrate to aid in the fermentation process. Nitrate is reduced to nitrite and $N_2$ or $NO_2$. Growth and sporulation of the bacteria was verified by the presence of nitrite in the incubation medium and by microscopic analyses. Thus, *Bacillus pseudofirmus* can survive in anaerobic conditions.

Growth of *Bacillus pseudofirmus* Under Pressure

A cement slurry specimen, water to solids ratio 0.5, with expanding clay particles, 30 µm average particle size, loaded with *Bacillus pseudofirmus* spores and calcium lactate, was cured under atmospheric conditions at 20° C. The sample was split in half and the two halves sealed together with an 8 µm space (representing a crack) between them and then placed in a pressurized cell at 10 MPa (98 atm) and 20° C. for a period of 170 days. A sample containing the expanded clay particles without the bacteria or calcium lactate was also prepared and tested in the same manner, as a baseline. The samples after curing were analyzed for nitrite, and for presence of calcium carbonate, indicating self-healing of the 8 µm crack. Results showed the presence of nitrite in the *Bacillus pseudofirmus* containing sample and in addition crystals of calcium carbonate were observed in the crack evidencing that *Bacillus pseudofirmus* can provide self-healing under pressure. The baseline cement specimen contained no nitrite or presence of calcium carbonate in the crack.

*Bacillus pseudofirmus* can mediate the production of calcium carbonate by the metabolic conversion of calcium lactate and cement matrix portlandite according to the following reaction:

$$Ca(C_3H_5O_3)_2 + 5Ca(OH)_2 + 6O_2 \rightarrow 6CaCO_3 + 10H_2O.$$

The produced calcium carbonate is known to decrease the permeability of cracks formed in cement-based materials.

Growth of *Bacillus pseudofirmus* at Elevated Temperatures

*Bacillus pseudofirmus* can be incubated in alkaline medium containing calcium lactate as a food source and nitrate to aid in the fermentation process, at increasing temperatures. Nitrate is reduced to $NO_2$ and $N_2$ or just to $NO_2$. Growth and sporulation of the bacteria can be verified by the presence of nitrite in the incubation medium and by microscopic analyses. The results will demonstrate the temperature sensitivity of the *Bacillus pseudofirmus*.

While the method and compositions have been described in conjunction with the disclosed embodiments and examples which are set forth in detail, it should be understood that this is by illustration only and this disclosure is not intended to be limited to these embodiments and examples. On the contrary, this disclosure is intended to cover alternatives, modifications, and equivalents which will become apparent to those skilled in the art in view of this disclosure.

What is claimed is:

1. A method of cementing a wellbore comprising:
   a) preparing a cement composition comprising a pumpable slurry of cement, water and a healing agent that comprises *Bacillus pseudofirmus* that is tolerant to pressure of 98 atm (10 MPa) and 20° C.;
   b) delivering the cement composition into the wellbore; and
   c) allowing the cement composition to set,
   wherein the wellbore has a downhole pressure of 1 atm-1000 atm (0.1-100 MPa); and
   wherein when the integrity of the set cement composition is breached, activating the *Bacillus pseudofirmus* in the set cement thereby causing them to grow and replicate at a pressure of at least 98 atm (10 MPa) to thereby restore the integrity of the set cement composition.

2. The method of claim 1 wherein preparing the cement composition comprises introducing the *Bacillus pseudofirmus* to one or more of the cement, water or cement slurry.

3. The method of claim 2 wherein preparing the cement composition further comprises introducing a nutrient for the *Bacillus pseudofirmus* to one or more of the cement, water or cement slurry.

4. The method of claim 3 wherein the nutrient is a carboxylic acid calcium salt or calcium lactate.

5. The method of claim 3 wherein the nutrient is encapsulated.

6. The method of claim 1 wherein the *Bacillus pseudofirmus* is a spore.

7. The method of claim 1 wherein the *Bacillus pseudofirmus* is encapsulated.

8. The composition claim 1 wherein the *Bacillus pseudofirmus* is encapsulated for release after the cement is set.

9. The method of claim 1 wherein the *Bacillus pseudofirmus* is capable of depositing calcium carbonate ($CaCO_3$), lime ($Ca(OH)_2$) or a biopolymer.

10. A method of restoring the integrity of a set cement composition in a wellbore, said method comprising:
    a) preparing a pumpable slurry that comprises water, a healing agent that comprises *Bacillus pseudofirmus* tolerant to pressure of 98 atm (10 MPa) and 20° C., and optionally, cement;
    b) pumping the slurry into the wellbore in and around the set cement composition, wherein the wellbore has a downhole pressure of 1 atm-1000 atm (0.1-100 MPa); and
    c) allowing the *Bacillus pseudofirmus* to grow and replicate to thereby restore the integrity of the set cement composition at a pressure of at least 98 atm (10 MPa).

11. The method of claim 10 wherein the *Bacillus pseudofirmus* is encapsulated.

12. The method of claim 10 wherein the *Bacillus pseudofirmus* is capable of depositing calcium carbonate ($CaCO_3$), lime ($Ca(OH)_2$) or a biopolymer.

13. The method of claim 10 further comprising introducing a nutrient into the wellbore.

14. The method of claim 13 wherein the nutrient is a carboxylic acid calcium salt or calcium lactate.

15. A method of restoring the integrity of a set cement composition in a wellbore, said method comprising:
    a) delivering a healing agent to the set cement in the wellbore, the healing agent comprising *Bacillus pseudofirmus* tolerant to pressure of 98 atm (10 MPa) and 20° C. and wherein the wellbore has a downhole pressure of 1 atm-1000 atm (0.1-100 MPa);
    b) allowing the *Bacillus pseudofirmus* to grow and replicate within the set cement to thereby restore the integrity of the set cement composition at a pressure of at least 98 atm (10 MPa).

16. The method of claim 15 wherein the delivering step comprises:
    a) introducing the *Bacillus pseudofirmus* to a conveyance fluid; and
    b) delivering the conveyance fluid to the set cement composition.

17. The method of claim 15 wherein the introducing step further comprises introducing a nutrient to the conveyance fluid.

18. The method of claim 15 wherein the delivering step comprises:
    a) isolating a portion of the wellbore having set cement requiring repair; and
    b) delivering the healing agent to the isolated portion of the wellbore.

19. The method claim 15 wherein the delivering step comprises:
    a) forming a fluid communication path in the wellbore along a portion of the set cement requiring repair; and
    b) introducing the healing agent to the fluid communication path.

* * * * *